S. G. WELLMAN.
SASH LOCK.
APPLICATION FILED SEPT. 21, 1909.
959,981.
Patented May 31, 1910.
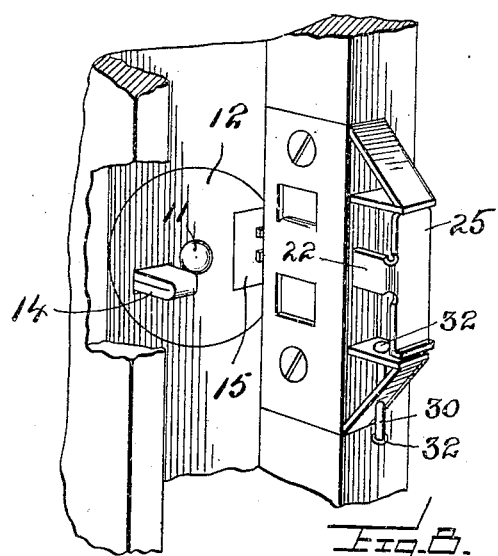
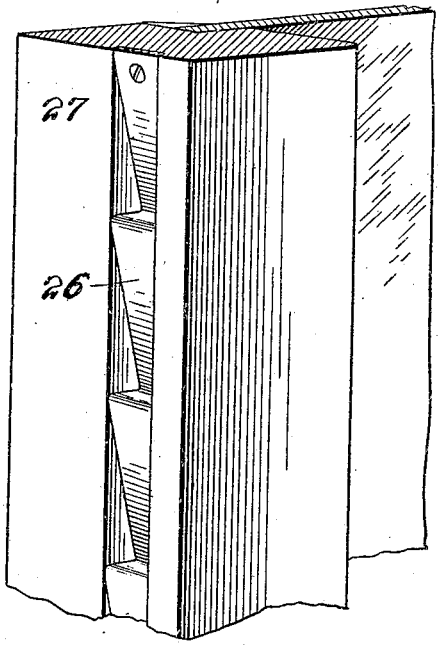
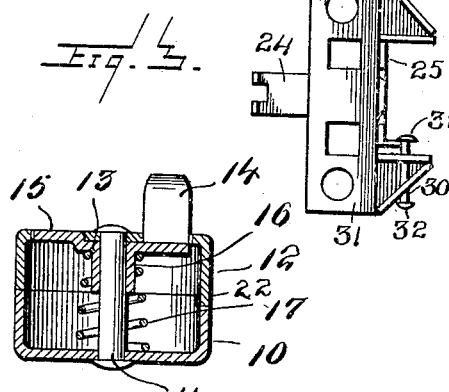
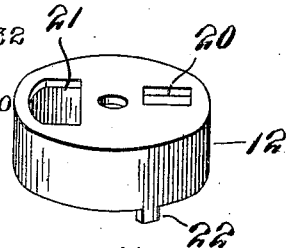
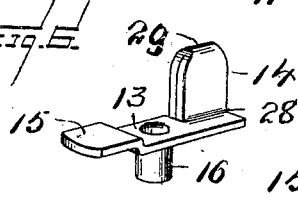
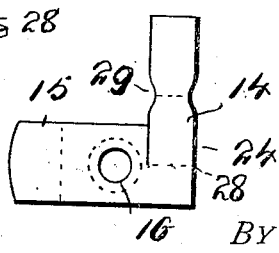
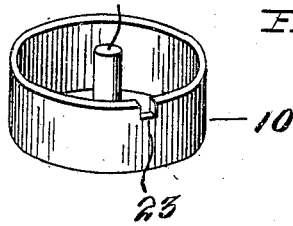
WITNESSES:
INVENTOR
Samuel G. Wellman
BY
E. B. Stocking
Attorney

UNITED STATES PATENT OFFICE.

SAMUEL G. WELLMAN, OF CORRY, PENNSYLVANIA.

SASH-LOCK.

959,981.   Specification of Letters Patent.   Patented May 31, 1910.

Application filed September 21, 1909. Serial No. 518,809.

*To all whom it may concern:*

Be it known that I, SAMUEL G. WELLMAN, citizen of the United States, residing at Corry, county of Erie, State of Pennsylvania, have invented certain new and useful Improvements in Sash-Locks, of which the following is a specification, reference being had therein to the accompanying drawing.

This invention relates to a sash lock and particularly to a structure comprising a spring actuated dog adapted to coöperate with a holding rack.

The invention has for an object to provide a slidingly mounted locking dog held under spring tension in contact with a coöperating rack.

Other and further objects and advantages of the invention will be hereinafter set forth and the novel features thereof defined by the appended claims.

In the drawings:—Figure 1 is a perspective of the invention showing the application of the lock to a window; Fig. 2 is a similar view showing the coöperating rack upon a sash; Fig. 3 is a central section through the lock; Fig. 4 a perspective of the cap plate; Fig. 5 a similar view of the casing; Fig. 6 a detailed perspective of the dog; Fig. 7 is a plan of the blank from which the dog is formed; and Fig. 8 is an elevation of the push plate.

Like numerals of reference refer to like parts in the several figures of the drawing.

The invention comprises a casing 10 preferably of circular form as shown and provided with the post or rivet 11 disposed centrally thereof and adapted to contact with the cover 12. Mounted upon the post 11 is a dog plate 13 provided at one end with a dog 14 and at the opposite end with a presser 15. This plate is also formed with a sleeve or collar 16 surrounding the post 11 and adapted to receive upon its outer surface the tension spring 17 which is preferably enlarged to a conical form with its base resting upon the casing 10. The cover 12 is provided with an aperture 20 for the dog 14 to extend therethrough while the aperture 21 receives the plate 15 in order to retract the dog by pressure thereon through any desired device for instance a plate 24 provided with a push handle 25, such for instance as shown in my Patent #751,586 dated February 9, 1904, which was adapted to be formed of sheet material stamped and bent into the proper shape. For the purpose of retaining the sash lock in unlocked position when it is desired to move the sashes for any purpose a latch bolt 30 is provided and slidingly mounted upon the frame 31 for the push plate. This bolt is provided with heads 32 at its opposite ends to limit its sliding movement and when raised as shown in Fig. 8 prevents an outward travel of the push handle 25 so that the latch is held in retracted position and the sash can be freely moved. The plate 15 is bent upward from the dog plate 13 so as to be flush with the surface of the cap plate 12 as shown in Fig. 3. The cap plate is provided with an interlocking lug 22 adapted to enter a coöperating recess 23 in the lock casing. The dog is held by its spring in contact with a rack bar 26 disposed in the recess of the window sash 27 which is slidingly mounted in the frame shown in Fig. 1.

This lock is adapted to be formed of sheet metal to be stamped and bent into the proper form to form the casing and cap shown in Figs. 4 and 5 while the dog is constructed from a blank as shown in Fig. 6. The laterally extended portion to form the dog 14 is bent upward from the blank upon the line 28 and thence downward on the line 29 to provide the completed dog as shown in Fig. 6. The sleeve 16 may be punched or drawn from the blank or separately attached thereto and this sleeve in its movement limits the inward travel of the dog plate by contact with the lock casing.

In the operation of the invention it will be seen that if pressure be applied to the presser plate the dog will be retracted from the shoulder of the rack bar so that the sash may be raised in the window frame while the inclined faces upon this bar act to retract the dog and permit the lowering of the window sash whenever desired, unless the push plate for operating the dog be used the dog is held under tension in contact with the rack at all times. The construction provides for a sliding movement of the dog and absolutely prevents any movement thereof out of alinement with the rack. The inward movement of the dog is limited by the sleeve thereon while in its outward movement it contacts with the cap plate. The parts of the lock and its dog are adapted to be formed of stamped sheet material thus providing a simple efficient and economically constructed form of sash lock in which the dog may be held out of operative position by the coöperating latch.

Having described my invention and set forth its merits, what I claim and desire to secure by Letters Patent is:—

1. In a sash lock, a casing, a post disposed therein, a plate provided with a locking dog and a sleeve surrounding said post and slidingly mounted thereon, and a spring surrounding said post and disposed between said plate and casing.

2. In a sash lock, a casing, a post disposed therein, a plate provided with a locking dog and slidingly mounted on said post, a spring disposed between said plate and casing, a cap plate provided with an aperture for said dog and an aperture opposite the dog plate, and a sleeve carried by said dog plate and surrounding said post.

3. In a sash lock, a locking dog comprising a plate having one end bent at an angle to the body and thence upon itself to form a dog and formed with an oppositely disposed sleeve projected therefrom.

4. In a sash lock, a circular casing provided with a centrally disposed post, a cap plate having a side wall provided with an interlocked connection with said casing and secured to said post, a plate provided with a dog and a sleeve surrounding said post and slidingly mounted thereon, and a spring surrounding said post to maintain the dog plate in contact with said cap.

5. In a sash lock, a casing, a sliding plate in said casing provided with a locking dog, a spring disposed between said plate and casing, a push plate engaging said sliding plate, and a latch plate mounted to intercept the push plate in its outward travel and retain said push plate in projected position.

6. In a sash lock, a casing, a plate provided with a locking dog slidingly mounted in said casing, a push plate engaging said sliding plate and provided with a laterally disposed handle thereon, and a latch slidingly mounted in the path of said handle to engage the same.

7. In a sash lock, a casing, a plate provided with a locking dog slidingly mounted in said casing, a frame having a sliding push plate mounted therein, a gravity latch mounted in said frame to engage said push plate, and tension means to normally hold said dog in locked position.

8. In a sash lock, a frame having a sliding push plate mounted therein, and a gravity latch mounted in said frame to retain said push plate in projected position.

9. In a sash lock, a frame having a sliding push plate mounted therein, a handle upon said plate, and a slidingly mounted latch bolt adapted to engage said handle.

In testimony whereof I affix my signature in presence of two witnesses.

SAMUEL G. WELLMAN.

Witnesses:
D. MITCHELL,
J. BURTON ARBUCKLE.